United States Patent
Janney et al.

(10) Patent No.: US 10,406,776 B2
(45) Date of Patent: Sep. 10, 2019

(54) THERMOPLASTIC BONDED PREFORMS AND THERMOSET MATRICES FORMED THEREWITH

(71) Applicant: Carbon Conversions, Inc., Lake City, SC (US)

(72) Inventors: Mark Janney, Lake City, SC (US); Mark Mauhar, Lake City, SC (US)

(73) Assignee: Carbon Conversions, LLC, Lake City, SC (US)

(*) Notice: Subject to any disclaimer, the term of this patent is extended or adjusted under 35 U.S.C. 154(b) by 318 days.

(21) Appl. No.: 15/432,156

(22) Filed: Feb. 14, 2017

(65) Prior Publication Data

US 2017/0239909 A1 Aug. 24, 2017

Related U.S. Application Data

(60) Provisional application No. 62/297,368, filed on Feb. 19, 2016, provisional application No. 62/297,455, filed on Feb. 19, 2016.

(51) Int. Cl.
  *B29C 70/42* (2006.01)
  *B29C 70/08* (2006.01)
  (Continued)

(52) U.S. Cl.
  CPC ............... *B32B 5/02* (2013.01); *B29B 11/00* (2013.01); *B29B 11/14* (2013.01); *B29C 48/00* (2019.02); *B29C 70/08* (2013.01); *B29C 70/42* (2013.01); *B32B 27/06* (2013.01); *C08J 5/047* (2013.01); *C08K 7/06* (2013.01); *C08L 23/12* (2013.01); *C08L 69/00* (2013.01); *C08L 77/02* (2013.01); *C08L 77/10* (2013.01); *D04H 1/4242* (2013.01); *B29B 15/10* (2013.01); *B32B 2262/106* (2013.01); *B32B 2305/076* (2013.01); *B32B 2307/72* (2013.01); *B32B 2309/02* (2013.01);
  (Continued)

(58) Field of Classification Search
  None
  See application file for complete search history.

(56) References Cited

U.S. PATENT DOCUMENTS 5,039,465 A * 8/1991 Freeman ............... B29B 11/16
                                                                162/116
5,820,801 A * 10/1998 Greve ................... B29B 11/16
                                                                264/86

(Continued)

FOREIGN PATENT DOCUMENTS

JP     2012/139841     7/2012
JP     2014/145048     8/2014
(Continued)

OTHER PUBLICATIONS

Janney et al, "Fabrication of Chopped Fiber Preforms by 3-DEP Process", Composites & Polycon 2007 (Year: 2007).*
(Continued)

*Primary Examiner* — Mary Lynn F Theisen
(74) *Attorney, Agent, or Firm* — Joseph T. Guy; Patent Filing Specialist, Inc.

(57) ABSTRACT

A thermoplastic bonded preform and method of manufacturing the preform are disclosed. The preform comprises a primary fiber comprising little or no sizing; a mechanical fiber; and a thermoplastic.

35 Claims, 1 Drawing Sheet

(51) Int. Cl.
    C08J 5/04      (2006.01)
    B29B 11/00     (2006.01)
    B29B 11/14     (2006.01)
    C08K 7/06      (2006.01)
    D04H 1/4242    (2012.01)
    B32B 5/02      (2006.01)
    B32B 27/06     (2006.01)
    C08L 23/12     (2006.01)
    C08L 69/00     (2006.01)
    C08L 77/10     (2006.01)
    C08L 77/02     (2006.01)
    B29C 48/00     (2019.01)
    B29B 15/10     (2006.01)

(52) U.S. Cl.
    CPC ....... B32B 2309/12 (2013.01); C08J 2300/22 (2013.01); C08J 2363/00 (2013.01); C08J 2367/02 (2013.01); C08J 2369/00 (2013.01); C08J 2377/02 (2013.01)

(56) References Cited

U.S. PATENT DOCUMENTS

| 7,678,307 | B1* | 3/2010 | Geiger | B28B 1/268 |
| | | | | 162/218 |
| 8,580,169 | B2* | 11/2013 | Bell | C04B 35/62204 |
| | | | | 264/86 |
| 2002/0119299 | A1* | 8/2002 | Chen | B01D 39/1607 |
| | | | | 428/311.51 |
| 2005/0230863 | A1* | 10/2005 | Scott | B29B 11/16 |
| | | | | 264/87 |
| 2006/0027792 | A1* | 2/2006 | Butcher | H01B 1/24 |
| | | | | 252/500 |
| 2010/0261014 | A1* | 10/2010 | Geiger, Jr. | B29C 33/36 |
| | | | | 428/396 |
| 2012/0225276 | A1 | 9/2012 | Rayner et al. | |
| 2015/0203642 | A1 | 7/2015 | Sonoda et al. | |

FOREIGN PATENT DOCUMENTS

| WO | WO 2007/053640 | 5/2007 |
| WO | WO 2013/056254 | 4/2013 |
| WO | WO 2015/037570 | 3/2015 |
| WO | WO 2015/098470 | 7/2015 |

OTHER PUBLICATIONS

Mauhar, M et al; Low Cost Carbon Fiber Composites for Lightweight Vehicle Parts; a presentation; Materials Innovation Technologies, LLC; May 16, 2012.

ISA/US; International Search Report and Written Opinion prepared for PCT/US2017/017794; Carbon Conversions, Inc.; Apr. 25, 2017.

* cited by examiner

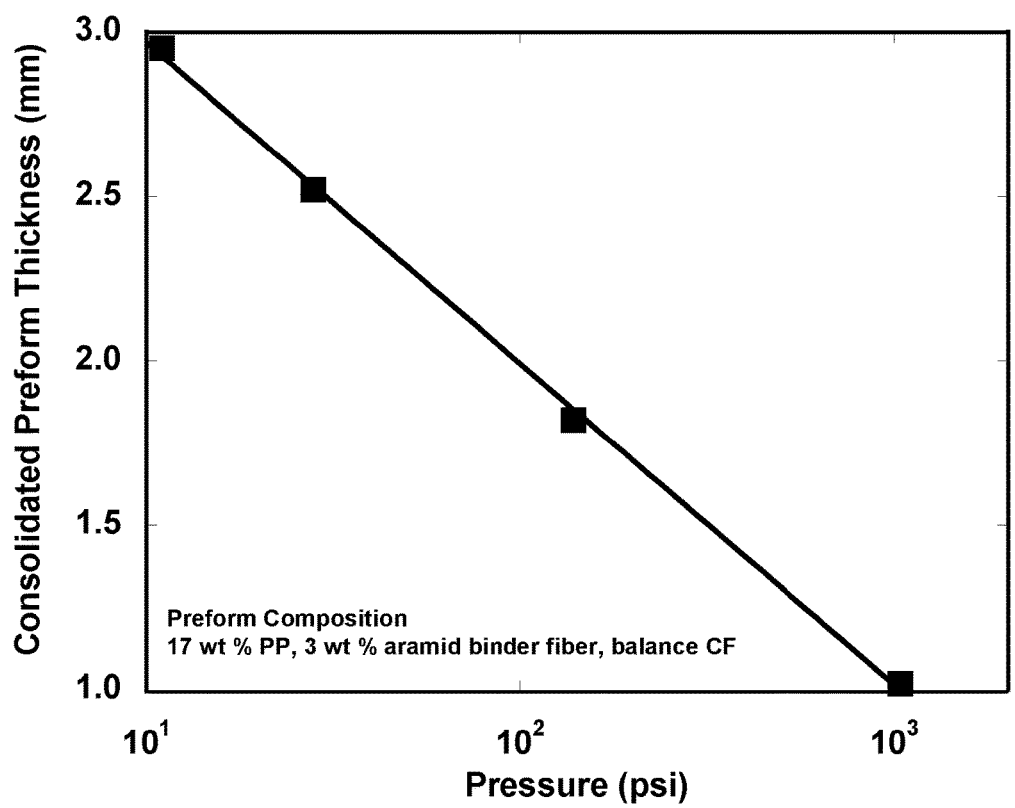

THERMOPLASTIC BONDED PREFORMS AND THERMOSET MATRICES FORMED THEREWITH

CROSS-REFERENCE TO RELATED APPLICATIONS

This application claims the priority benefit under 35 U.S.C. section 119 of U.S. Provisional Patent Application No. 62/297,368 filed Feb. 19, 2016 and U.S. Provisional Patent Application No. 62/297,455 filed Feb. 19, 2016 both of which are incorporated by reference.

FIELD OF THE INVENTION

The present invention is related to thermoplastic bonded preforms, their formation and the use of thermoplastic bonded preforms as a reinforcement in thermoset matrices.

BACKGROUND

Fiber reinforced plastics have found wide spread use in many applications due to their excellent strength to weight ratio as compared to metals and other materials. The demand for some materials, such as carbon reinforced plastics, has increased to the point where fiber supply is challenged and cost has risen accordingly. This has lead to a desire to reuse fibers, particularly carbon fibers, in an effort to augment supply, decrease cost, and convert a material, which is otherwise scrap, into a repurposed component of a product.

The surface of carbon fiber is difficult to work with as there is little that will bond thereto. Carbon fiber is therefore typically treated, in a process referred to in the art as "sizing", whereby the surface of the carbon fiber is chemically modified to improve the bonding characteristics of the fiber allowing the fiber to be incorporated into a matrix as a reinforcement.

During most carbon fiber recycle operations the sizing is unfortunately removed, or compromised, thereby rendering the carbon fiber very difficult to work with. Carbon fibers with little or no sizing have a low bulk density and the fibers tend to become airborne easily due to the lack of adhesion between fibers. Virgin fiber, which has not been sized, has the same problems and there is a parallel need to utilize virgin fiber along with, or instead of, recycled carbon fiber. Resizing the recycled carbon fibers is not cost effective and not a viable operation commercially.

There is a significant desire in the art for methods to utilize a recycled fiber, particularly with little or no sizing, in a form which is compatible with subsequent operations. The present invention provides fibers, and particularly carbon fibers with little or no sizing, as a thermoplastic bonded preform suitable for use in subsequent applications particularly as a reinforcement in a thermoset matrix composite.

SUMMARY OF THE INVENTION

The invention relates to a method of incorporating fibers, and particularly carbon fibers with little or no sizing, into a composite as a thermoplastic bonded preform.

A particular feature of the invention is the ability to utilize recycled, or virgin, carbon fiber without the requirement of resizing or otherwise chemically modifying the fibers.

An advantage of the invention is the ability to incorporate carbon fiber as a thermoplastic bonded preform for subsequent use.

These and other embodiments, as will be realized, are provided in a thermoplastic bonded preform comprising a primary fiber comprising little or no sizing; a mechanical fiber; and a thermoplastic.

Yet another embodiment is provided in a method of forming a thermoplastic bonded preform. The method comprises:
forming a blend comprising solvent, a primary fiber comprising little or no sizing, a mechanical fiber and a thermoplastic;
forming an unconsolidated preform of the blend wherein the unconsolidated preform comprises the primary fiber, the mechanical fiber and the thermoplastic; and
consolidating the unconsolidated preform under heat and pressure to form the thermoplastic bonded preform.

BRIEF DESCRIPTION OF DRAWINGS

FIG. 1 is a graphical illustration of an embodiment of the invention.

DESCRIPTION

The present invention is related to an improved method for incorporation of fibers, particularly fibers with little or no sizing, to form a thermoplastic bonded preform. More specifically, the present invention is related to the formation of a thermoplastic bonded preform and a thermoset matrix comprising the thermoplastic bonded preform as a reinforcement referred to herein as a thermoplastic bonded preform reinforced thermoset.

A thermoplastic bonded preform is a nonwoven composite comprising a primary fiber, a mechanical fiber and a thermoplastic fiber. As will be realized from further discussion, a primary fiber, mechanical fiber and thermoplastic are formed into a composite which is a thermoplastic bonded preform for subsequent use as will be described more specifically herein.

The primary fibers are preferably carbon fiber and most preferably a discontinuous or chopped carbon fiber. Carbon fiber with little or no sizing is suitable for demonstration of the invention and the ability to use fibers with little or no sizing demonstrates a particular advantage offered by the invention. The term "little or no sizing" refers to a carbon fiber which has either been recycled, and therefore the sizing has been eliminated, compromised, or significantly reduced to between 0.0 and 0.5% of the carbon fiber weight, or the carbon fiber is a "virgin fiber" which is a term of art indicating the fiber is in the "as manufactured" condition. Fiber with sizing can be used in the process, however, the advantages offered by the invention are more appropriately realized with fibers having little or no sizing. The carbon fiber length and thickness is not particularly limiting herein. Fibers with a length of about 0.254 cm to 5 cm (0.1 to 2 inch), and more preferably 0.508 cm to 1.78 cm (0.2 to 0.7 inches) are suitable for demonstration of the invention. Readily available carbon fibers typical have diameters between about 5 and about 9 μm. The size and high stiffness of the fibers, typically at least about 30 Mpsi, typically forms a very low density nonwoven when air laid. The fibers typically pack in a random nature due to the lack of any inter-fiber adhesion.

The mechanical fibers are preferably highly fibrillated fibers which physically adhere the carbon fibers in a mat especially after densification. The choice of mechanical fiber is not particularly limited with the proviso that they can adhere to carbon fibers, particularly with little or no sizing, and can be adequately wet by molten or viscous thermoplastic. Particularly preferred mechanical fibers include cotton linter, fibrillated cellulosic fiber, fibrillated acrylic fiber and fibrillated aramid fiber.

The thermoplastic is not necessarily limited herein. The thermoplastic can be used as a fiber, or any form which allows intimate mixing prior to forming such as a powder of flake. Fibers are preferred for manufacturing simplicity. Any thermoplastic is appropriate for this application. Examples include, but are not limited to, polyethylene (PE), polypropylene (PP), polyesters such as polyethylene terephthalate (PET) or polybutylene terephthalate (PBT), polyamides (PA) such as nylon 6 (PA6) or nylon 66 (PA66), polycarbonate (PC), polyphenylene sulfide (PPS), polysulfones such as polyethersulfone (PESU) or polyphenylsulfone (PPSU), polyetherimide (PEI), polyether-ether-ketone (PEEK), polyether-ketone-ketone (PEKK), and blends of the above fibers.

In a preferred process of forming the thermoplastic bonded fiber a discontinuous primary fiber, a mechanical fiber and a thermoplastic is dispersed in a solvent, with water being preferred, to form a blend. The blend preferably comprises a solids content of 15-94.5 wt % primary fiber, 0.5 to 5 wt % mechanical fiber and 5 to 84.5 wt % thermoplastic. More preferably the blend comprises a solids content of 70-94 wt % primary fiber, 1 to 5 wt % mechanical fiber and 5 to 30 wt % thermoplastic.

The blend is formed as a web The web may be formed on a wet lay forming machine such as a RotoFormer, an inclined wire or a Fourdrinier. Alternatively, the web can be formed by a dry lay or air lay process such as carding or needle punching. The wet laid web is dried after formation to form an unconsolidated preform.

The unconsolidated preform is densified under heat and pressure, as will be more fully described herein, to increase the density thereby forming a densified thermoplastic bonded preform with a higher density than the unconsolidated preform.

The bulk density of the unconsolidated preform is typically less than about 0.2 g/cm$^3$ and can be as low as 0.05 g/cm$^3$. The consolidating pressure should be sufficient to increase the bulk density above that of the unconsolidated preform. It is preferable for the densified thermoplastic bonded preform to have a bulk density of at least 0.25 g/cm$^3$ up to about 1.0 g/cm$^3$. A density below about 0.25 g/cm$^3$ is insufficient to realize the advantages of the invention in most subsequent uses and a density above 1.0 g/cm$^3$ is difficult to achieve with reasonable pressures, temperatures and times. The fiber volume fraction that can be achieved in the thermoplastic bonded preform is generally dictated by the amount of pressure that is applied during consolidation. The higher the consolidating pressure, the higher the density of the composite.

Consolidation pressures from about 30 kpa to about 14,000 kpa are suitable for demonstration of the invention. Pressure can be applied using a vacuum bag, a compression molding press, a laminating press, a series of calenders, a double belt press, or other suitable consolidation operations. The thickness of a 17 wt % PP bonded recycled carbon fiber as a function of applied pressure is illustrated in FIG. 1 wherein the thickness is indicated to decrease as the log of applied pressure increases. It is preferable that the consolidation pressure remain until the composite cools at last to below its glass transition temperature or its melting point and more preferably to a temperature of no more than 60° C. and most preferably to ambient temperature of about 25° C.

The consolidating temperature should be above the glass transition temperature ($T_g$) of an amorphous thermoplastic, such as PC or PEI, or above the melting point ($T_m$) of crystalline or partially crystalline polymers, such as PA, PET or PPS, to ensure good bonding between the thermoplastic and both the primary fiber and mechanical fiber. The temperature is preferably high enough that the polymer flows well and bonds to the carbon fibers. The appropriate consolidation temperature is a function of the polymer being used and is best determined through a series of experiments.

The thermoplastic bonded preform may be in a fibrous form, sheet form or molded form and can be either flat, as in a platelet shape, or they may have any three dimensional shape, as in a 3-DEP® preform.

The consolidated preforms have sufficient mechanical properties to be cut into smaller, dimensionally stable pieces, which may be further processed.

In a particularly preferred embodiment the thermoplastic bonded preform can be infiltrated with thermoset resin thereby forming a composite which is a thermoplastic bonded preform reinforced thermoset.

To demonstrate a thermoplastic bonded preformed reinforced thermoset composite the thermoplastic bonded preform is preferably infiltrated with thermoset resin. The method of infiltration is not particularly limited herein and can be achieved using liquid compression molding, vacuum infusion, resin transfer molding, etc.

Thermoset resins are selected from acrylic resins, polyesters, vinyl esters, epoxies polyurethanes and furan.

Examples

A series of aqueous slurries were prepared comprising solids in the ratios set forth in Table 1 wherein "BAL RCF" refers to the balance of the solids content being recycled carbon fiber. Preforms were formed using a conventional wet laid, nonwoven process. The preforms comprised 1.27 cm (0.5 inch) long recycled carbon fiber (RCF), with little or no sizing, with fibrillated para-aramid fiber as a mechanical binder fiber and a thermoplastic fiber as listed in Table 1. The wet laid thickness (after drying), molded thickness, ratio of wet laid thickness ($T_w$) to molded thickness ($T_m$), bulk density, molded density vol %, percentage of molded density attributable to recycled carbon fiber (RCF FVF), molded air permeability and molding temperature are provided in Table 1. Permeability of the preforms are given in Tables 1, 2, and 3. As shown in Tables, 1, 2, and 3, the addition of a thermoplastic binder to the preform composition followed by the application of pressure at elevated temperature resulted in a greatly increased density of the thermoplastic bonded preform after cooling. The as-fabricated, wet-laid preforms had bulk densities between 0.06 and 0.13 g/cm$^3$. The densified thermoplastic bonded preforms achieved densities between 0.46 and 0.80 g/cm$^3$.

All of the consolidated preforms had enough strength to be cut into smaller, dimensionally stable preforms for subsequent processing.

TABLE 1

Thermoplastic-bonded carbon fiber preforms-thickness, density, FVF, and permeability.
All samples were made as 800 gsm wet-laid preforms, then compression molded to final thickness.
Air permeability was measured through the thickness of the preforms.

| Preform Composition (wt %) | Thickness Wetlaid (mm) | Thickness Molded (mm) | $T_W/T_M$ | Bulk Density Wetlaid (g/cm$^2$) | Bulk Density Molded (g/cm$^2$) | Molded Density (vol %) | Molded RCF FVF (vol %) | Molded Air Permeability (cm$^2$) | Molding Temperature (° C.) |
|---|---|---|---|---|---|---|---|---|---|
| 20% PA6, 3% Aramid, BAL RCF | 6.3 | 1.00 | 6.30 | 0.13 | 0.800 | 50.1 | 34.2 | 1.40E−08 | 270 |
| 9% PA6, 3% Aramid, BAL RCF | 8.5 | 2.01 | 4.23 | 0.09 | 0.396 | 23.5 | 19.4 | 4.43E−08 | 270 |
| 9% PA6, 3% Aramid, BAL RCF | 8.5 | 1.47 | 5.78 | 0.09 | 0.541 | 32.1 | 26.6 | 2.54E−08 | 270 |
| 9% PA6, 3% Aramid, BAL RCF | 8.5 | 1.09 | 7.80 | 0.09 | 0.730 | 43.3 | 35.8 | 1.43E−08 | 270 |
| 9% PC, 3% Aramid, BAL RCF | 12.46 | 1.25 | 9.97 | 0.06 | 0.621 | 37.4 | 31.3 | 1.68E−08 | 280 |
| 9% CoPET/PET, 3% Aramid, BAL RCF | 8.25 | 1.75 | 4.71 | 0.10 | 0.460 | 26.4 | 22.3 | 2.83E−08 | 141 |
| 9% CoPET/PET, 3% Aramid, BAL RCF | 8.25 | 1.27 | 6.50 | 0.10 | 0.644 | 36.4 | 30.8 | 1.70E−08 | 270 |

TABLE 2

Density, Thickness, and Specific Volume vs Consolidation Pressure
for 17PP/3Aramid/80RCF preforms
Test preforms were made at 800 gsm areal density.
As-fabricted preform thickness ~11.4 mm

| Pressure in 12 × 12 inch tool (psi) | Thickness (mm) | Compaction Ratio- Unpressed to Pressed | Relative Density (vol %) | RCF FVF (vol %) | Molded Density (g/cm$^3$) | Molded Specific Volume (cm$^3$/g) | Air Permeability (cm$^2$) |
|---|---|---|---|---|---|---|---|
| 11 | 2.95 | 3.86 | 17.6 | 12.00 | 0.27 | 3.69 | 3.33E−08 |
| 28 | 2.52 | 4.52 | 20.6 | 14.10 | 0.32 | 3.15 | — |
| 139 | 1.83 | 6.23 | 28.6 | 19.40 | 0.44 | 2.27 | 2.54E−08 |
| 1042 | 1.02 | 11.18 | 50.9 | 34.80 | 0.78 | 1.28 | 1.37E−08 |

TABLE 3

17PP/3Aramid/80RCF preforms consolidated to 1.0 mm and cooled
under pressure experienced springback after pressure was removed.
180° C. pressing temperature

| PP Content (wt %) | Thickness after Molding (mm) | Compaction Ratio- Unpressed to Pressed | Relative Density (vol %) | RCF FVF (vol %) | Molded Density (g/cm$^3$) | Molded Specific Volume (cm$^3$/g) | Air Permeability (cm$^2$) |
|---|---|---|---|---|---|---|---|
| 5 | 2.10 | 5.43 | 22.4 | 19.40 | 0.38 | 2.63 | 2.82E−08 |
| 8 | 1.44 | 7.92 | 33.5 | 27.40 | 0.56 | 1.80 | 1.87E−08 |
| 17 | 1.02 | 11.18 | 50.9 | 34.80 | 0.78 | 1.28 | 1.37E−08 |

Three compositions of thermoplastic bonded preforms were selected to be made into thermoset composites. After consolidation, the preforms were cut into 6 inch×12 inch (150 mm×300 mm) coupons. Epoxy resin (Prime 20VL, Gurit Services AG, Zurich) was infiltrated into the preforms, cured at ambient temperature, then post cured at 65° C. After curing, the samples were tested in flexure to determine their mechanical properties, Table 4. The strengths and moduli of these samples were similar to those for products made with conventional preforms.

TABLE 4

Properties of PP-bonded carbon fiber preforms and of epoxy-infiltrated composites made from the same

| PP content (wt %) | Consolidating Pressure (kPa) | Preform Consolidated Thickness (mm) | Relative Density of Preform (vol %) | Porosity of Preform (vol %) | FVF in Preform and Composite (vol %) | Composite Flexure Strength (MPa) | Composite Flexure Modulus (GPa) |
|---|---|---|---|---|---|---|---|
| 5 | 7171 | 2.1 | 22.4 | 77.6 | 19.4 | 155.3 | 8.4 |
| 8 | 7171 | 1.44 | 33.5 | 66.5 | 27.4 | 207.9 | 12.5 |
| 17 | 958 | 1.83 | 28.6 | 71.4 | 19.4 | 174.9 | 10.5 |

Throughout the description the terms "fiber" and "fibers" both refer to multiple fibers equally unless stated otherwise.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A method of forming a thermoplastic bonded preform comprising:
   forming a blend comprising solvent, a primary fiber comprising little or no sizing, a mechanical fiber and a thermoplastic;
   forming an unconsolidated preform of said blend wherein said unconsolidated preform comprises said primary fiber, said mechanical fiber and said thermoplastic;
   consolidating said unconsolidated preform under heat and pressure to form said thermoplastic bonded preform wherein the blend has a solids content comprising 15-94.5 wt % said primary fiber, 0.5 to 5 wt % mechanical fiber and 5 to 84.5 wt % thermoplastic.

2. The method of forming a thermoplastic bonded preform of claim 1 wherein said unconsolidated preform has a density of 0.05 to 0.2 g/cm³.

3. The method of forming a thermoplastic bonded preform of claim 1 wherein said pressure is 30 kpa to 14,000 kpa.

4. The method of forming a thermoplastic bonded preform of claim 1 wherein said temperature is above a glass transition temperature or a melting point of said thermoplastic.

5. The method of forming a thermoplastic bonded preform of claim 1 wherein said pressure is applied until said thermoplastic bonded preform cools to below a glass transition temperature or a melting point of said thermoplastic.

6. The method of forming a thermoplastic bonded preform of claim 1 wherein said pressure is applied until said thermoplastic bonded preform cools to a temperature of no more than 30° C.

7. The method of forming a thermoplastic bonded preform of claim 1 wherein said thermoplastic bonded preform has a density of 0.25 to 1 g/cm³.

8. The method of forming a thermoplastic bonded preform of claim 1 wherein said primary fiber is a carbon fiber.

9. The method of forming a thermoplastic bonded preform of claim 8 wherein said carbon fiber is selected from a recycled carbon fiber and a virgin carbon fiber.

10. The method of forming a thermoplastic bonded preform of claim 1 wherein said primary fiber has a length of 0.254 cm to 2.54 cm.

11. The method of forming a thermoplastic bonded preform of claim 10 wherein said primary fiber has a length of 0.508 cm to 1.78 cm.

12. The method of forming a thermoplastic bonded preform of claim 1 wherein said primary fiber has a diameter of between 5 and about 9 μm.

13. The method of forming a thermoplastic bonded preform of claim 1 wherein said primary fiber has a stiffness of at least 30 Mpsi.

14. The method of forming a thermoplastic bonded preform of claim 1 wherein said mechanical fiber is a fibrillated fiber.

15. The method of forming a thermoplastic bonded preform of claim 1 wherein said mechanical fiber is selected from the group consisting of cotton linter, cellulosic fiber, acrylic fiber and aramid fiber.

16. The method of forming a thermoplastic bonded preform of claim 1 wherein said thermoplastic is selected from the group consisting of polyethylene, polypropylene, polyester, polyamide, polycarbonate, polyphenylene sulfide, polysulfone, polyetherimide, poly ether ether ketone, polye ether ketone ketone, and blends thereof.

17. The method of forming a thermoplastic bonded preform of claim 16 wherein said thermoplastic is selected from the group consisting of polyethylene terephthalate, polybutylene terephthalate, nylon 6, nylon 66, polyethersulfone and polyphenylsulfone.

18. The method of forming a thermoplastic bonded preform of claim 1 further comprising infusing said thermoplastic bonded preform with a resin.

19. The method of forming a thermoplastic bonded preform of claim 18 wherein said resin is a thermoset resin.

20. The method of forming a thermoplastic bonded preform of claim 19 wherein said resin is selected from the group consisting of epoxy, acrylic resin, polyester, vinyl ester, epoxy, polyurethane, furan, and bis-maleimides.

21. A method of forming a thermoplastic bonded preform comprising:
   forming a blend comprising solvent, a primary fiber comprising little or no sizing, a mechanical fiber and a thermoplastic;
   forming an unconsolidated preform of said blend wherein said unconsolidated preform comprises said primary fiber, said mechanical fiber and said thermoplastic wherein said unconsolidated preform has a density of 0.05 to 0.2 g·cm³; and
   consolidating said unconsolidated preform under heat and pressure to form said thermoplastic bonded preform wherein said thermoplastic bonded preform has a density of 0.25 to 1 g/cm³.

22. The method of forming a thermoplastic bonded preform of claim 21 wherein said unconsolidated preform has a density of 0.06 to 0.13 g/cm³.

23. The method of forming a thermoplastic bonded preform of claim 21 wherein said thermoplastic bonded preform has a density of 0.46 to 0.80 g/cm³.

24. The method of forming a thermoplastic bonded preform of claim 21 wherein said primary fiber has a length of 0.508 cm to 1.78 cm.

25. The method of forming a thermoplastic bonded preform of claim 21 wherein said primary fiber has a diameter of between 5 and about 9 μm.

26. The method of forming a thermoplastic bonded preform of claim 21 wherein said primary fiber has a stiffness of at least 30 Mpsi.

27. The method of forming a thermoplastic bonded preform of claim 21 wherein said mechanical fiber is a fibrillated fiber.

28. A method of forming a thermoplastic bonded preform comprising:
   forming a blend comprising:
      solvent; and
      a solid content comprising:
         a primary fiber comprising little or no sizing wherein said primary fiber has a length of 0.254 cm to 2.54 cm;
         a mechanical fiber; and
         5 to 84.5 wt % thermoplastic;
   forming an unconsolidated preform of said blend wherein said unconsolidated preform comprises said primary fiber, said mechanical fiber and said thermoplastic;
   consolidating said unconsolidated preform under heat and pressure to form said thermoplastic bonded preform wherein said heat is at a temperature above a glass transition temperature or a melting point of said thermoplastic; and
   infusing said thermoplastic bonded preform with a resin.

29. The method of forming a thermoplastic bonded preform of claim 28 wherein said unconsolidated preform has a density of 0.05 to 0.2 g/cm³.

30. The method of forming a thermoplastic bonded preform of claim 28 wherein said thermoplastic bonded preform has a density of 0.25 to 1 g/cm³.

31. The method of forming a thermoplastic bonded preform of claim 28 wherein said primary fiber has a length of 0.508 cm to 1.78 cm.

32. The method of forming a thermoplastic bonded preform of claim 28 wherein said primary fiber has a diameter of between 5 and about 9 μm.

33. The method of forming a thermoplastic bonded preform of claim 28 wherein said primary fiber has a stiffness of at least 30 Mpsi.

34. The method of forming a thermoplastic bonded preform of claim 28 wherein said mechanical fiber is a fibrillated fiber.

35. The method of forming a thermoplastic bonded preform of claim 28 wherein said mechanical fiber is selected from the group consisting of cotton linter, cellulosic fiber, acrylic fiber and aramid fiber.

* * * * *